United States Patent [19]

Sakaguchi

[11] Patent Number: 5,358,197
[45] Date of Patent: Oct. 25, 1994

[54] CLUTCH CONTROL MECHANISM FOR BAIT-CASTING REEL

[75] Inventor: Noboru Sakaguchi, Tondabayashi, Japan

[73] Assignee: Shimano Inc., Osaka, Japan

[21] Appl. No.: 878,204

[22] Filed: May 4, 1992

[30] Foreign Application Priority Data

May 9, 1991 [JP] Japan .................. 3-031506[U]

[51] Int. Cl.$^5$ .................................... A01K 89/033
[52] U.S. Cl. .................................................. 242/261
[58] Field of Search ............... 242/259, 260, 261, 262

[56] References Cited

U.S. PATENT DOCUMENTS

| | | | |
|---|---|---|---|
| 4,593,869 | 6/1986 | Yasui et al. ............... | 242/261 |
| 4,640,471 | 2/1987 | Murakami et al. .......... | 242/261 X |
| 4,798,355 | 1/1989 | Kaneko ...................... | 242/261 |
| 4,824,046 | 4/1989 | Emura et al. .............. | 242/261 |
| 5,163,635 | 11/1992 | Sato ........................... | 242/261 |

FOREIGN PATENT DOCUMENTS 2-46296 12/1990 Japan .

Primary Examiner—Daniel P. Stodola
Assistant Examiner—Michael R. Mansen
Attorney, Agent, or Firm—Dickstein, Shapiro & Morin

[57] ABSTRACT

A bait-casting reel has a drive mechanism for driving a spool shaft carrying a spool and a clutch mechanism for transmitting a drive force from the drive mechanism to the spool. The reel also has a shifter displaceable between a first position for engaging the clutch and a second position for disengaging the clutch, a control lever for selecting one of the two positions and an urging spring unit associated with the shifter. The control lever is displaceable between a first control position corresponding to the first position and a second control position corresponding to the second position. The urging spring unit includes first and second springs and an urging-force switchover member. With operation of the switchover member, either a toggle mode or a momentary mode is selected. In the toggle mode, when the control member is at the first control position, the first spring urges the shifter to the first position. Also, when the control member is placed at the second control position, the first spring urges the shifter to the second position while the second spring remains substantially inoperative on the shifter. Also, when the control in the momentary mode, the second spring urges the shifter to the first position, while the first spring remains substantially inoperative on the shifter.

5 Claims, 7 Drawing Sheets

CLUTCH CONTROL MECHANISM FOR BAIT-CASTING REEL

BACKGROUND OF THE INVENTION

1. Field of the Invention

The present invention relates to a bait-casting reel, and more particularly to a clutch control mechanism for a bait-casting reel.

2. Description of the Related Art

The prior art disclosed a fishing reel in which a clutch mechanism for transmitting a drive force from a handle to a spool is engaged or disengaged by a finger operation on a control member of a control device for the mechanism.

A further control mechanism of this type is known from a fishing reel disclosed by e.g. Japanese laid-open utility model gazette Hei 2-46296. This fishing reel provides two modes. Namely, when the clutch is engaged, an urging means provided in the control device urges the clutch in the engaging direction. This is the first mode. Whereas, when the clutch is disengaged, the engaging means urges the clutch in the disengaging direction. This is the second mode. These two modes are realized by means of two springs. More particularly, in the first mode, a first spring urges the clutch in the engaging direction when the clutch is engaged and urges the clutch in the disengaging direction when the clutch is disengaged. In either case of this first mode, a second spring remains at its neutral position and thus does not affect the clutch. In the second mode, on the other hand, the first spring functions in the same manner as in the first mode, whereas the second spring is expanded beyond the neutral position. This second spring has an urging force larger in magnitude than that of the first spring so that the second spring constantly urges the clutch in the engaging direction. That is, in the second mode of this conventional construction, both springs are tensed. For this reason, a large operation force is required to overcome the combined urging force of the two springs in switching the clutch control member from the engaging position to the disengaging position.

SUMMARY OF THE INVENTION

A primary object of the present invention is to solve the above-described inconvenience associated with the conventional construction of a reel by providing a clutch control mechanism of the above type with improvement which allows an easy and smooth switchover of the clutch in either of the two modes.

For accomplishing the above object, according to the present invention, in a bait-casing reel, having a spool shaft mounting a spool, a drive mechanism for driving the spool shaft and a clutch mechanism for selectively transmitting a drive force from the drive mechanism to the spool, the reel comprises:

a shifter means displaceable between a first position for engaging the clutch mechanism and a second position for disengaging the clutch mechanism;

a control member for selecting either the first or second position of the shifter means; and an urging means associated with the shifter means. Said control member is displaceable between a first control position corresponding to said first position and a second control position corresponding to said second position. The urging means includes an urging-force switchover means, a first urging means and a second urging means and is selectable between a first mode and a second mode through an operation of the urging-force switchover means.

In the first mode, when the control member is in the first control position, the first urging means urges the shifter means to the first position. On the other hand, when the control member is in the second control position, the first urging means urges the shifter means to the second position while the second remains substantially inoperative on the shifter means.

In the second mode, the second urging means urges the shifter means to the first position, while the first urging means remains substantially inoperative on the shifter means. Either of the urging means being substantially inoperative, in reality, means that the operating finger does not feel force due to the inoperative urging means.

With the above-described construction, in either mode, only one of the two urging means is operative. So that, the clutch can be operated with reduced operating force which is sufficient to overcome the urging force of only one urging means.

Further, and other objects, features and effects of the invention will become more apparent from the following more detailed description of the embodiments of the invention with reference to the accompanying drawings.

DESCRIPTION OF THE PREFERRED EMBODIMENTS

Preferred embodiments of the present invention will now be described in particular with reference to the accompanying drawings.

Figure 1:
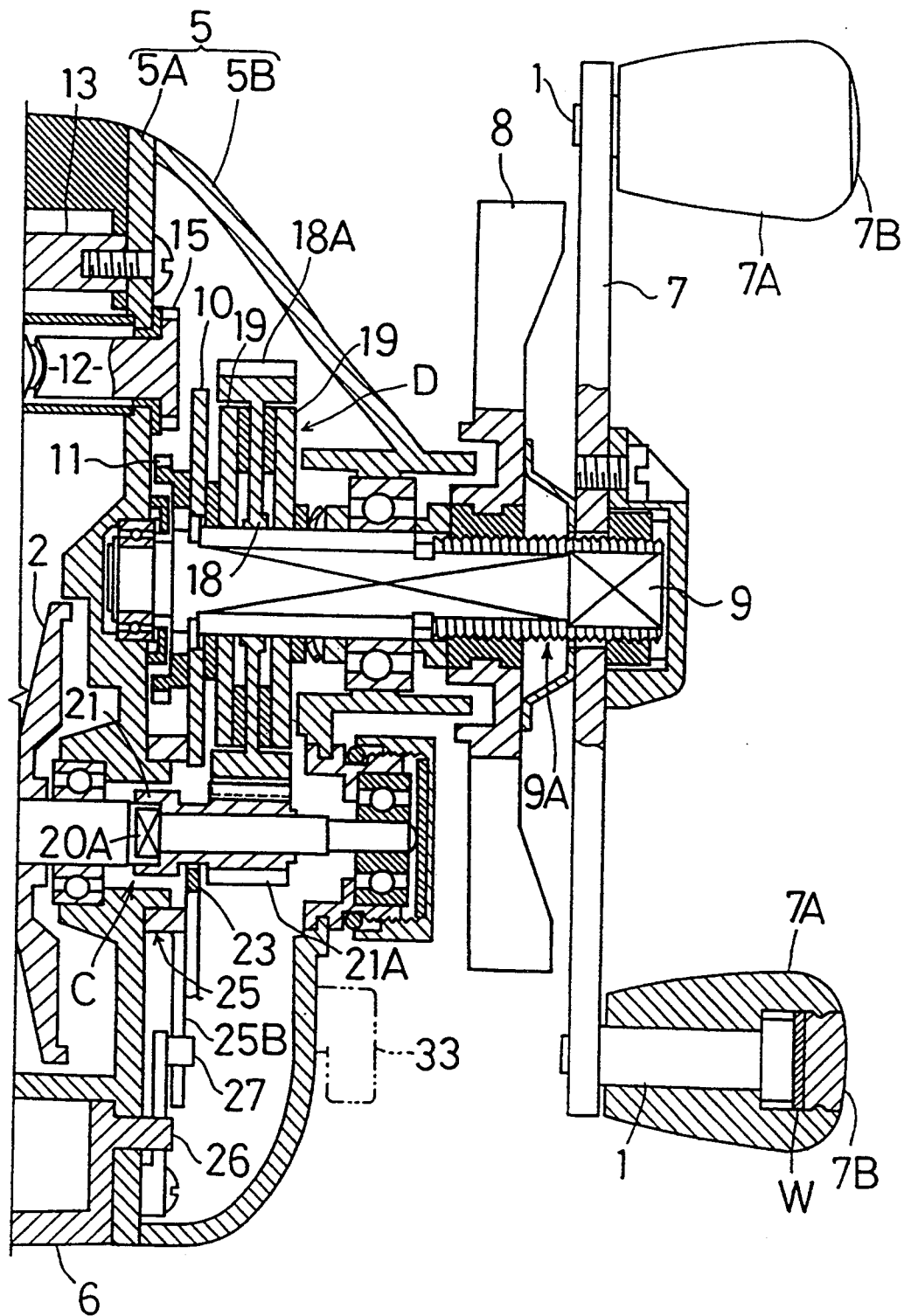
FIG. 1 is a section view showing a right half of a bait-casting reel relating to the present invention.
Figure 2:
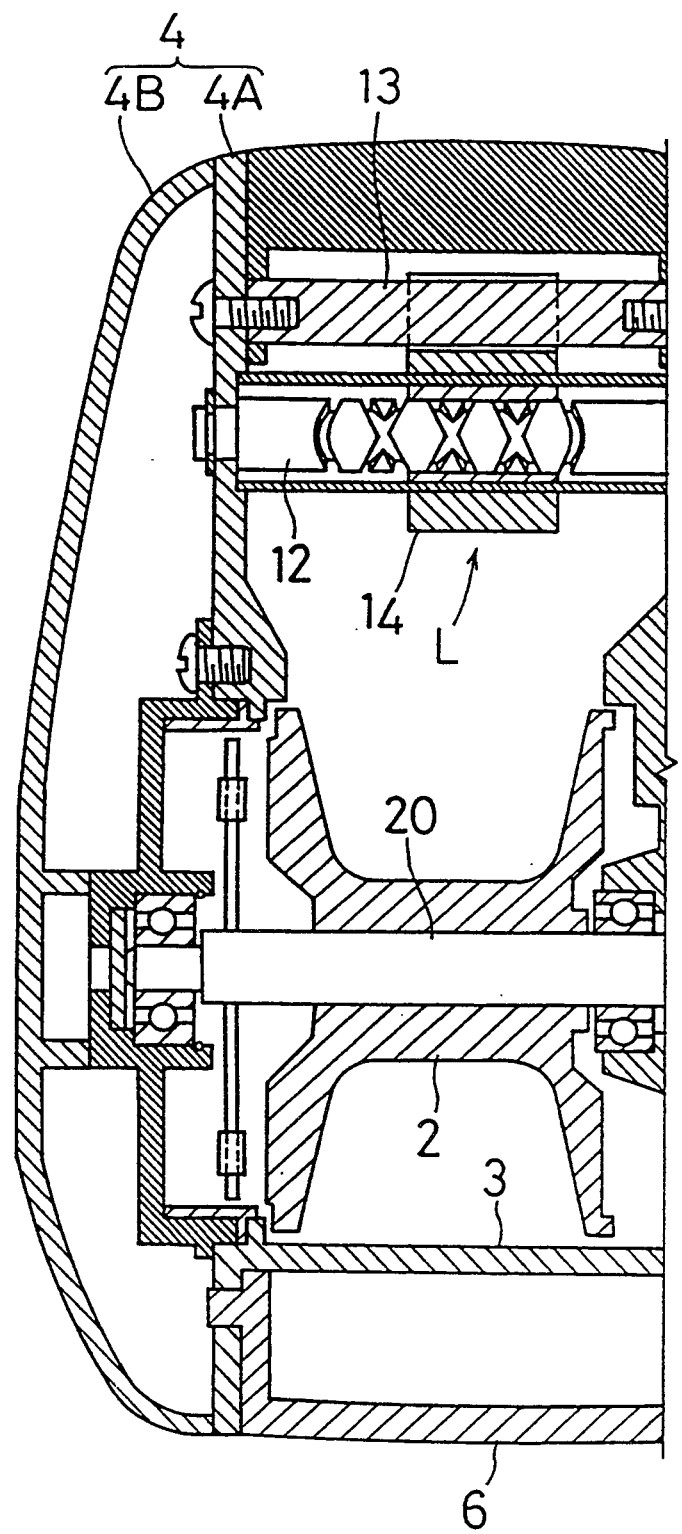
FIG. 2 is a section view showing a left half of the bait-casting reel of the invention.

FIGS. 1 and 2 show a right-hand half and a left-hand half of a bait-casting fishing reel. In these drawings, a fishing line is unwound from the reel in an upper direction. This direction will be referred to as a forward direction while the opposite direction, i.e. a downward direction in the drawings will be referred to as a rear direction, hereinafter. Referring now to FIG. 2, between side cases 4 and 5, a level-wind mechanism L, a spool 2, and a thumbrest 3 are provided at a forward portion, a middle portion, and a rear portion of the reel respectively. Rearwardly of the thumbrest 3, there is disposed a clutch control member 6 operable to allow free rotation of the spool 2. Further, a handle 7 for retrieving the fishing line is provided outwardly of the right-hand side case 5.

The handle 7 has a grip 7A rotatably mounted on a shaft 1. A cup 7B is fitted on a terminal end of the grip 74. A reference letter W denotes a washer for preventing wobbling of the grip 7A.

The right and left side cases 4, 5 include side plates 4A, 5A and outer cover members 4B, 5B for covering outer sides of the side plates. A handle shaft 9 connected with the handle 7 is extended between the right-hand side plate 5A and the right-hand outer cover member 5B.

The handle shaft 9 defines, on an outer periphery thereof, a threaded portion 9A, on which a drag control lever 8 is threaded. The handle shaft 9 further mounts a drag mechanism D, a ratchet wheel 10 and a gear 11 for transmitting a force to the level-wind mechanism L. In FIG. 1, a reference numeral 13 denotes a cross bar for reinforcing a forward portion of the reel.

Next, the level-wind mechanism L will be particularly described. A rotational force from the handle 7 is transmitted to a worm shaft 12 through the handle shaft 9, the gear 11, an intermediate gear 16 (shown in FIG. 3) and a gear 15 fitted on an end of the worm shaft 12. With rotation of the worm shaft 12, a line guide member 14 is moved along a guide groove thereby to reciprocate on the worm shaft 12. With this reciprocating motion of the line guide 14, the fishing line is retrieved level about the spool.

Figure 3:
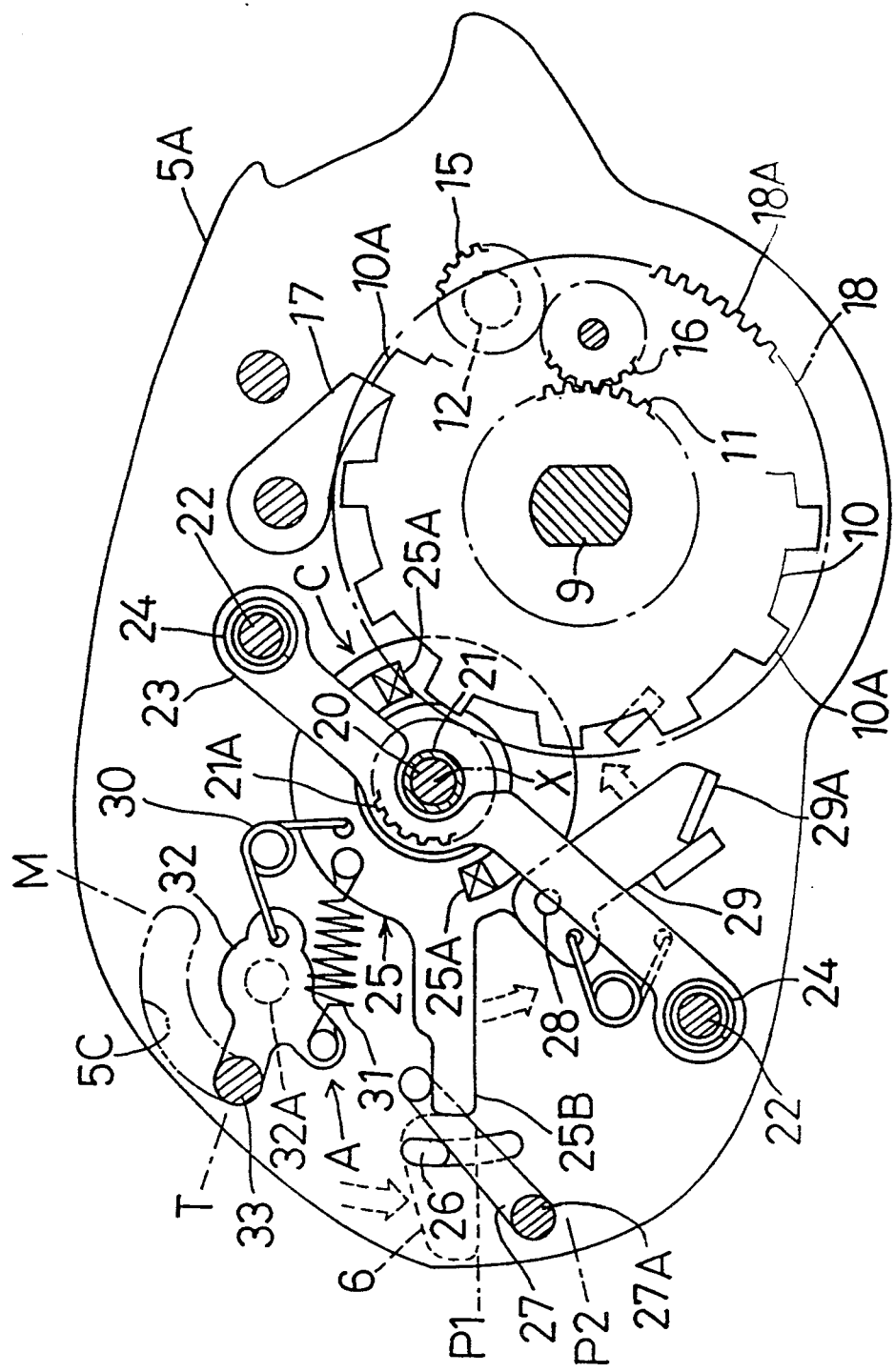
FIG. 3 is a side view of a clutch control unit where a clutch is engaged in a toggle mode, with unessential parts being eliminated from the view for the purpose of clarity.

Referring now to FIG. 3, an outer periphery of the ratchet wheel 10 defines radially projecting teeth 10A. Adjacent this ratchet wheel 10 is a ratchet pawl 17 engageable with the teeth 10A to prevent reverse rotation of the handle shaft 9.

Referring back to FIG. 1, the handle shaft 9 carries a pair of friction plates 19 capable of receiving torque from the shaft 9. Between these friction plates 19, a disc 18 having an output gear portion 18A is fixed on the handle shaft 9. In operation, by rotating the drag control lever 8, it is possible to adjust a frictional force provided from the friction plates 19 to the disc 18.

As shown in FIG. 2, the spool 2 is rendered rotatable in unison with a spool shaft 20. At an intermediate portion of this spool shaft 20, as shown particularly in FIG. 1, there is provided an engaging portion 20A, which is engageable with a clutch member 21 rotatably supported on the spool shaft 20. In addition to being rotatable about the spool shaft 20, the clutch member 21 is capable also of moving axially of the spool shaft 20. For instance, in FIG. 1, this clutch member 21 is shifted to the left to engage the engaging portion 20A of the spool shaft 20. This position of the clutch member 21 will be referred to as an engaging position. On the other hand, a disengaging position is realized when the clutch member 21 is shifted to the right. The clutch member 21 has an input gear portion 21A. Thus, the rotational force from the handle 7 is transmitted through the handle shaft 9, the disc 18 and the output gear portion 18A to the clutch member 21. Then, when the clutch member 21 is engaged with the engaging portion 20A, the above-described rotational force is further transmitted via the spool shaft 20 eventually to the spool 2 to rotate this for retrieving the fishing line thereabout.

Figure 4:
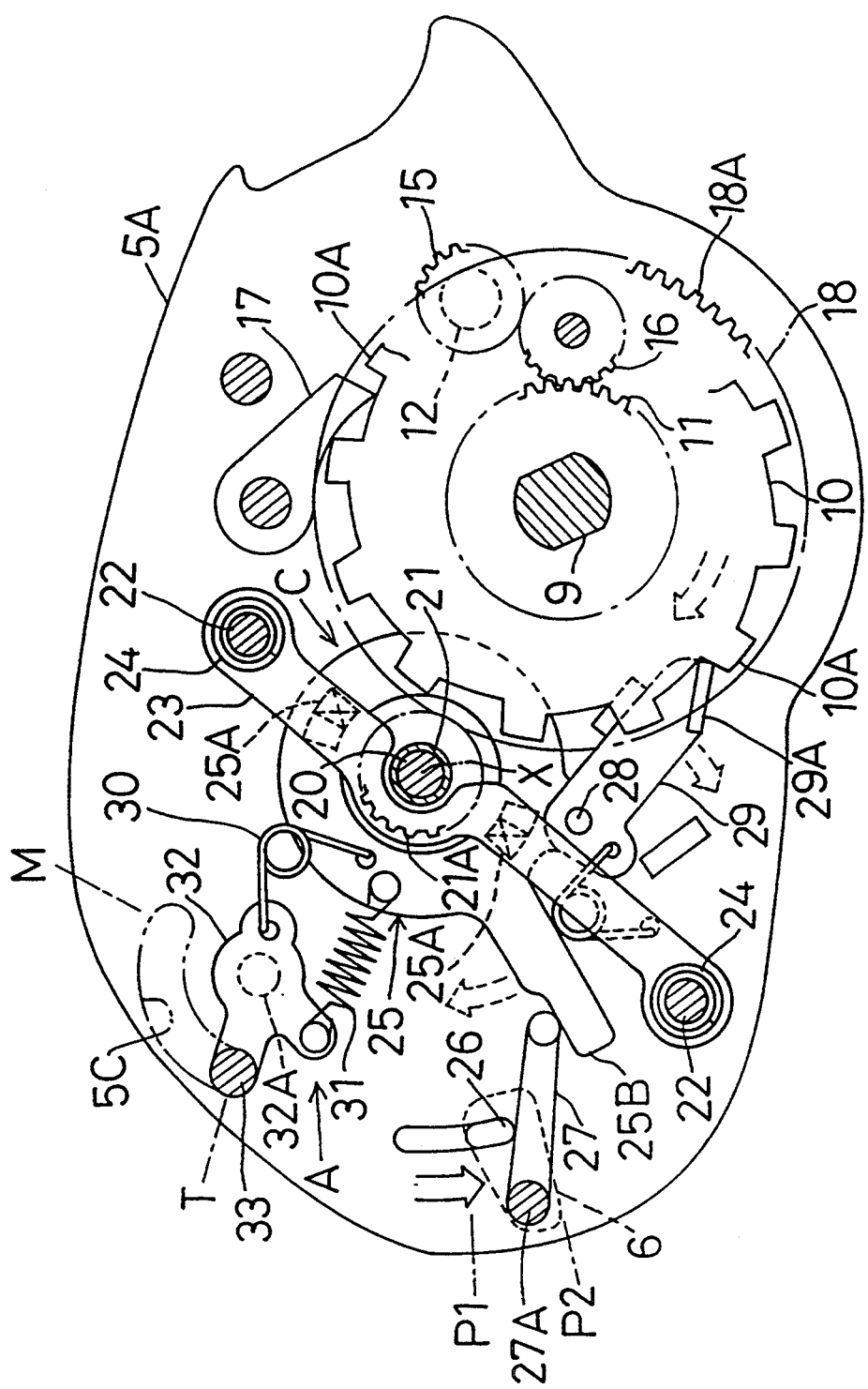
FIG. 4 is a side view of the clutch control unit where the clutch is disengaged in the toggle mode, with unessential parts being eliminated from the view for the purpose of clarity.

Next will be described a mechanism for selectively realizing the engagement and non-engagement between the clutch member 21 and the engaging portion 20A. Incidentally, in the following description, the direction for realizing the engagement between the clutch member 21 and the engaging portion 20A, i.e. the leftward direction in FIG. 1, will be referred to as a clutch engaging direction. Whereas, the opposite direction for realizing the non-engagement between the two, i.e. the rightward direction in FIG. 1, will be referred to as a clutch disengaging direction, hereinafter. Further, these components, i.e. the clutch member 21 and the engaging portion 20A will be generically referred to as a clutch mechanism C. The clutch member 21 is engaged with a shifter 23 for moving this clutch member 21 along the axis of the spool shaft 20. This shifter 23, as best shown in FIG. 3, has a straight plate-like configuration. Further, two opposed ends of this shifter 23 are supported on a pair of support shafts 22, which extend in parallel with the spool shaft 20, so that the shifter can move along the support shafts 2. Each of these support shafts 22 carries an urging spring 24 for urging the clutch member 21, through the shifter 23, in the aforementioned engaging direction. Accordingly, by the urging forces of these two springs 24, the clutch member 21 is kept engaged with the engaging portion 20A. For moving the shifter 23 in the disengaging direction against the urging forces of the springs 24, there is provided a control element 25 which is rotatable about the spool shaft 20. And, this control element 25 includes a cam face 25A. FIG. 3 illustrates a condition where this cam face 25A is not engaged with the shifter 23 so that the clutch member 21 is engaged with the engaging portion 20A. This position assumed by the control element 25 will be referred to as a clutch engaging position. FIG. 4 illustrates a further condition where the cam face 25A, with a counterclockwise rotation thereof, comes into engagement with the shifter 23 so that the shifter 23 is pushed up in the clutch disengaging direction thereby to release the engagement between the clutch member 21 and the engaging portion 20A. This position of the control element 25 will be referred to as a clutch disengaging position.

Next, a mechanism for operating this control element 25 will be particularly described. FIGS. 1 and 2 show a clutch control lever 6, to a right-hand end of which a pin 26 is attached. As shown in FIG. 3, this pin 26 is engaged with a pivot arm 27 pivotably supported on a shaft 27A. Then, as the clutch control member 6 is pushed, i.e. into the picture of FIG. 1, an opposite end of the pivot arm 27 from the shaft 27A pushes an arm portion 25A of the control element 25. As a result, as illustrated in FIG. 4, the control element 25 is rotated counterclockwise to the clutch disengaging position. As descried hereinbefore, with this counterclockwise rotation of the control element 25, its cam face 25A moves the shifter 23 in the disengaging direction to release the engagement between the clutch member 21 and the engaging portion 20A for allowing free rotation of the spool 2.

As shown in FIG. 3, the control element 25 also includes a return arm 29, which is pivotably mounted on a pivot shaft 28 attached to this control element 25. In operation, with the above-described counterclockwise rotation of the control element 25, a leading end of this return arm 29 comes into engagement with the teeth 10A of the ratchet wheel 10. Therefore, if the handle 7 is rotated in the line retrieving direction when the free rotation of the spool 2 is allowed, the ratchet wheel 10 is rotated clockwise in FIG. 3 to push the return arm 29 thereby to rotate the control element 25 clockwise to the clutch engaging position. As a result, the clutch member 21 becomes engaged with the engaging portion 20A to allow the rotation of the handle 7 to be transmitted to the spool 2.

As shown in FIGS. 3 through 6, this spinning reel is provided with a mode switchover mechanism A for selecting between a toggle mode and a momentary mode which are to be particularly described next. In the drawings, a letter T denotes a toggle mode position and a further letter M-denotes a momentary mode position of this switchover mechanism A. The mode switchover mechanism A consists essentially of a first spring 30, a second spring 31 (a coil spring) and a switching member 32. The switching member 32 is pivotably supported on a shaft portion 32A of the side plate 5A. Further, this switching member 32 integrally carries, at a terminal end thereof, a finger control piece 33 which is extended or exposed through an elongated slot 5C defined in the outer cover member 5B out of the reel casing so as to be finger-operated by a user for a mode switchover operation.

The first and second springs 30, 31 are supported by a pair of engaging portions formed in the switching member 32 and a pair of further engaging portions formed in the control element 25.

When the mode switchover mechanism A is set to the toggle mode position T, the first spring 30 is compressed beyond its neutral state, thus exerting an expanding urging force. Then, as shown in FIG. 3, when the control element 25 is set at the clutch engaging position, the first spring 30 urges this element 25 in the clutch engaging direction. On the other hand, as shown in FIG. 4, when the control element 25 is set at the clutch disengaging position, the first spring 30 urges the element 25 in the clutch disengaging direction. That is, when the mode switchover mechanism A is set to the toggle mode position T, the first spring 30 allows toggling between the clutch engaging state and the clutch disengaging state. In this mode, on the other hand, the second spring 31 is maintained at its neutral state and therefore does not affect the control element 25.

Figure 5:
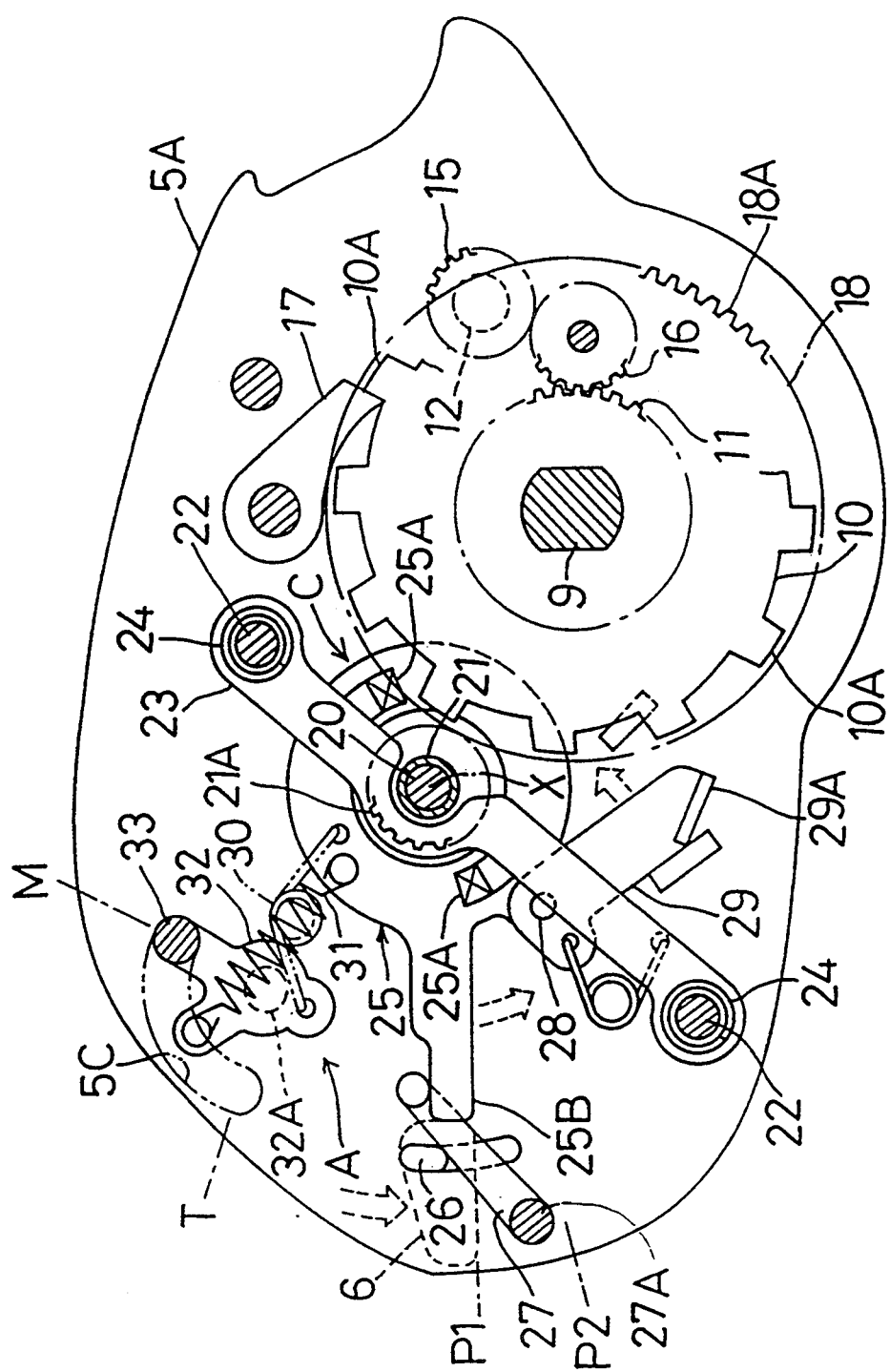
FIG. 5 is a side view of the clutch control unit where the clutch is engaged in a momentary mode, with unessential parts being eliminated from the view for the purpose of clarity.
Figure 6:
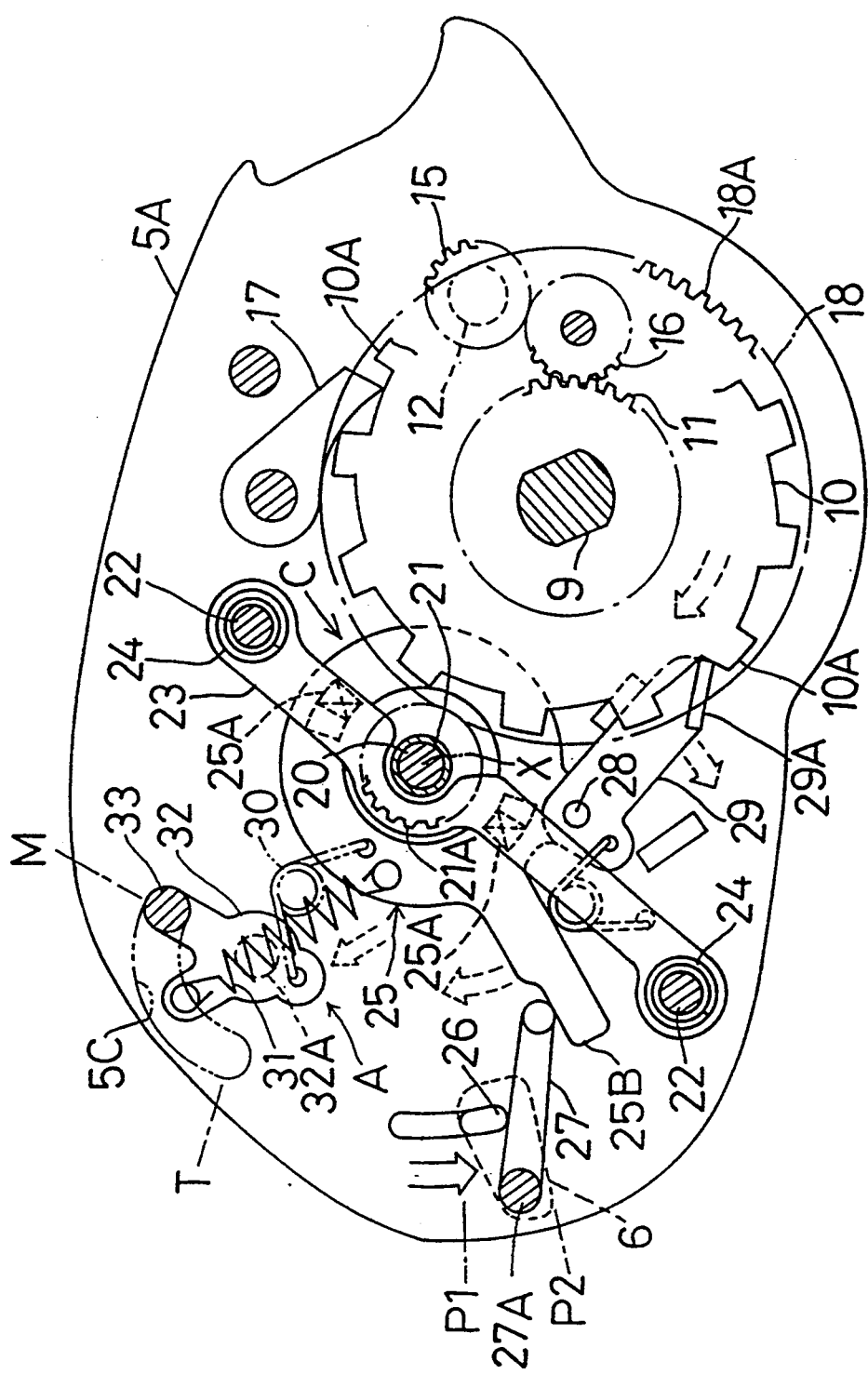
FIG. 6 is a side view of the clutch control unit where the clutch is disengaged in the momentary mode, with unessential parts being eliminated from the view for the purpose of clarity.

Whereas, when the mode switchover mechanism A is set to the momentary mode position M, as illustrated in FIGS. 5 and 6, the second spring 31 is expanded beyond its neutral state. Then, as shown in FIG. 5, if the control element 25 is set at the engaging position, the second spring 31, because the spring 31 is expanded along the spool shaft 20, does not provide any torque to the control element 25 under this condition. On the other hand, as illustrated in FIG. 6, in case the control element 25 is rotated to the disengaging position by means of the clutch control member 6, the second spring 31 does provide torque to return this control element 25 to the engaging position. That is, when the mode switchover mechanism A is set to the momentary mode, when the spool rotation is allowed by pressing the clutch control member 6, this state is immediately released upon release of the finger pressing force on the control member 6, because the control element 25 is returned to the clutch engaging position by the above-described urging force of the second spring 31 to again allow transmission of the rotational force from the handle to the spool 2. Further, when the mode switchover mechanism A is set at the momentary mode position M as described above, the first spring 30 is maintained at its neutral state and therefore does not provide torque to the control element 25.

As may be apparent from the above description, according to the present invention, the first spring is provided for the toggle mode and the second spring is provided for the momentary mode. When the mode switchover mechanism A is set at the toggle mode, the second spring remains inoperative. Whereas, when the mechanism A is set at the momentary mode, the first spring remains inoperative. Therefore, the construction of the present invention can avoid the problem of the prior art concerning the difficulty of mode switchover operation which is effected by operating the control member 6 against the combined significant urging forces of two springs.

In embodying the present invention, it is conceivable to employ a plate spring, a rubber material or the like in place of the springs described in the foregoing embodiment.

Figure 7:
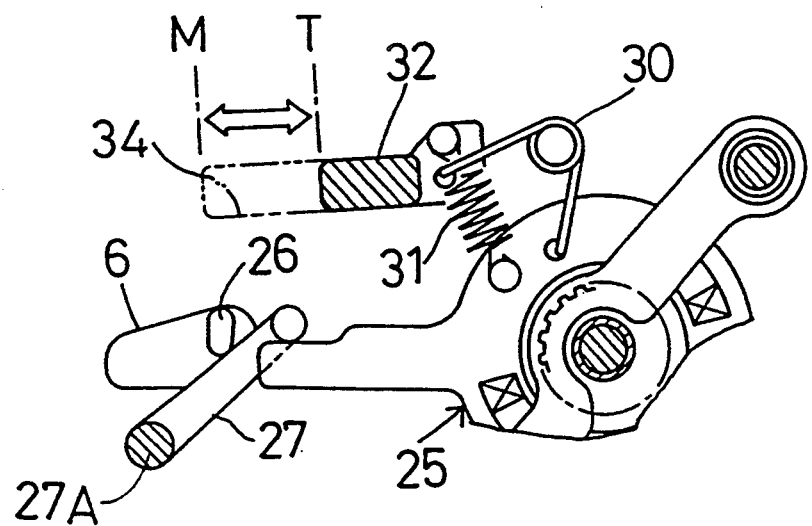
FIG. 7 is a partial view showing an urging mechanism relating to a second preferred embodiment of the invention where an urging-force switchover unit is set to the toggle mode.
Figure 8:
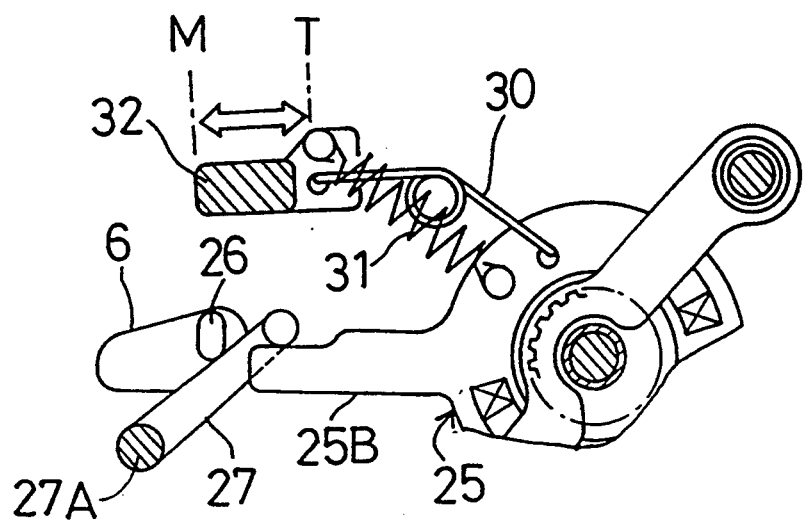
FIG. 8 is a partial view showing the urging mechanism of the second preferred embodiment where the urging-force switchover unit is set to the momentary mode.

Further, as shown in FIGS. 7 and 8, it is also conceivable to render the switching member 32 slidable along a guide groove 34. Incidentally, FIG. 7 shows a condition where the mode switchover mechanism is set at the toggle mode while FIG. 8 shows a further condition where the mechanism is set at the momentary mode. It is to be noted that in these drawings relating to this further embodiment the components corresponding to those of the foregoing embodiment are denoted with the same reference numerals and letters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A clutch control mechanism for a bait-casting reel, the mechanism comprising:
   a spool shaft for supporting a spool;
   a clutch mechanism including an engaging portion provided on said spool shaft and a clutch member engageable with said engaging portion;
   shifter means for engaging and disengaging said clutch mechanism, said shifter means being displaceable between a clutch mechanism engaging position and a clutch mechanism disengaging position;
   a control lever for displacing said shifter means from said engaging position to said disengaging position, said lever being displaceable between first and second positions corresponding to said engaging and disengaging positions of said shifter means, respectively;
   first and second urging means for applying urging forces to said shifter means, and
   urging force switchover means for moving said first and second urging means to toggle mode and momentary mode positions;
   wherein said clutch control mechanism is arranged such that:

(A) when said first and second urging means are in said toggle mode position, and said control lever is in said first position, said first urging means urges said shifter means toward said engaging position while said second urging means is in a substantially neutral state thereof providing substantially no urging force to said shifter means;

(B) when said first and second urging means are in said toggle position, and said control lever is in said second position, said first urging means urges said shifter means toward said disengaging position while said second urging means is in the substantially neutral state thereof providing substantially no urging force to said shifter means;

(C) when said first and second urging means are in said momentary mode position and said control lever is in said first position, said second urging means urges said shifter means toward said engaging position and said first urging means is in a substantially neutral state thereof providing substantially no urging force to said shifter means; and (D) when said first and second urging means are in said momentary mode position and said control lever is in said second position, said second urging means urges said shifter means toward said engaging position while said first urging means is in the substantially neutral state thereof providing substantially no urging force to said shifter means.

2. A clutch control mechanism according to claim 1, wherein said shifter means includes a control element pivotable about said spool shaft, and wherein said first urging means includes a toggle spring, and wherein said second urging means includes a coil spring, each of said springs having first and second ends, said first ends of said springs being connected to said control element, said second ends of said springs being connected to said switchover means.

3. A clutch control mechanism according to claim 2, said mechanism being arranged such that: (A) said toggle spring is compressed and applies an urging force to said control element when said first and second urging means are in said toggle mode position; (B) said coil spring is maintained in a substantially neutral state when said first and second urging means are in said toggle mode position; (C) said toggle spring is in a substantially neutral state when said first and second urging means are in said momentary mode position; and (D) said coil spring is tensioned and applies an urging force to said control element when said first and second urging means are in said momentary mode position.

4. A clutch control mechanism according to claim 1, wherein, when said clutch member is engaged with said engaging portion, a rotational force is transmitted to the spool shaft through said clutch member and said engaging portion.

5. A clutch control mechanism according to claim 4, wherein said shifter means further includes:
a shifter,
a pivot arm,
a pair of support shafts parallel to said spool shaft, said shifter being mounted on said support shafts and being axially movable relative to said support shafts,
a third shaft provided independently of said support shafts, said pivot arm being pivotably connected to said third shaft,
said control element including a cam member contactable with said shifter; and
wherein, when said control lever is pivotably displaced from said first position to said second position, said control lever operates on said pivot arm and thereby causes said control element to pivot, whereby said clutch member is moved by said cam member out of engagement with said engaging portion.

* * * * *